United States Patent [19]

Erhardt et al.

[11] Patent Number: 4,633,619
[45] Date of Patent: Jan. 6, 1987

[54] APPARATUS FOR THE MANUFACTURE OR MACHINING OF GEARS BY ROLLING ON A TOOL HAVING ABRASIVE WORKING SURFACES

[75] Inventors: Manfred Erhardt, Puchheim; Herbert Loos, Dorfen-Stadt; Gerhard Reichert, Puchheim, all of Fed. Rep. of Germany

[73] Assignee: Carl Hurth Maschinen-und Zahnradfabrik GmbH & Co., Munich, Fed. Rep. of Germany

[21] Appl. No.: 754,791

[22] Filed: Jul. 12, 1985

[30] Foreign Application Priority Data

Jul. 13, 1984 [DE] Fed. Rep. of Germany ....... 3425880

[51] Int. Cl.$^4$ ............................................. B24B 5/36
[52] U.S. Cl. ................................ 51/105 GG; 51/287; 409/5
[58] Field of Search ............... 51/26, 52 R, 52 HB, 51/95 GH, 105 HB, 105 GG, 287; 409/5, 37, 49, 61

[56] References Cited

U.S. PATENT DOCUMENTS

| | | | |
|---|---|---|---|
| 1,708,570 | 4/1929 | Hanson | 51/287 X |
| 1,884,292 | 10/1932 | Schurr | 51/95 GH X |
| 2,996,847 | 8/1961 | Saari | 51/287 X |
| 3,085,369 | 4/1963 | Findley | 51/52 R |
| 3,152,422 | 10/1964 | Loxham | 51/95 GH X |
| 4,203,258 | 5/1980 | Held | 51/95 GH |

FOREIGN PATENT DOCUMENTS

| | | | |
|---|---|---|---|
| 326083 | 12/1917 | Fed. Rep. of Germany | 51/26 |
| 1161465 | 7/1964 | Fed. Rep. of Germany | . |
| 2306780 | 8/1974 | Fed. Rep. of Germany | . |

Primary Examiner—Robert P. Olszewski
Attorney, Agent, or Firm—Flynn, Thiel, Boutell & Tanis

[57] ABSTRACT

Apparatus for the manufacture or machining of gears with a toothed tool having abrasive working surfaces, in which workpiece and tool, during rotation, are supported by the tooth system of a guide-gear pair. The apparatus works with a single-flank contact between workpiece and tool, whereby for changing the tooth flanks which contact one another, one member of the drive chain can be rotated relative to the other members a preselectable or adjustable amount.

3 Claims, 16 Drawing Figures

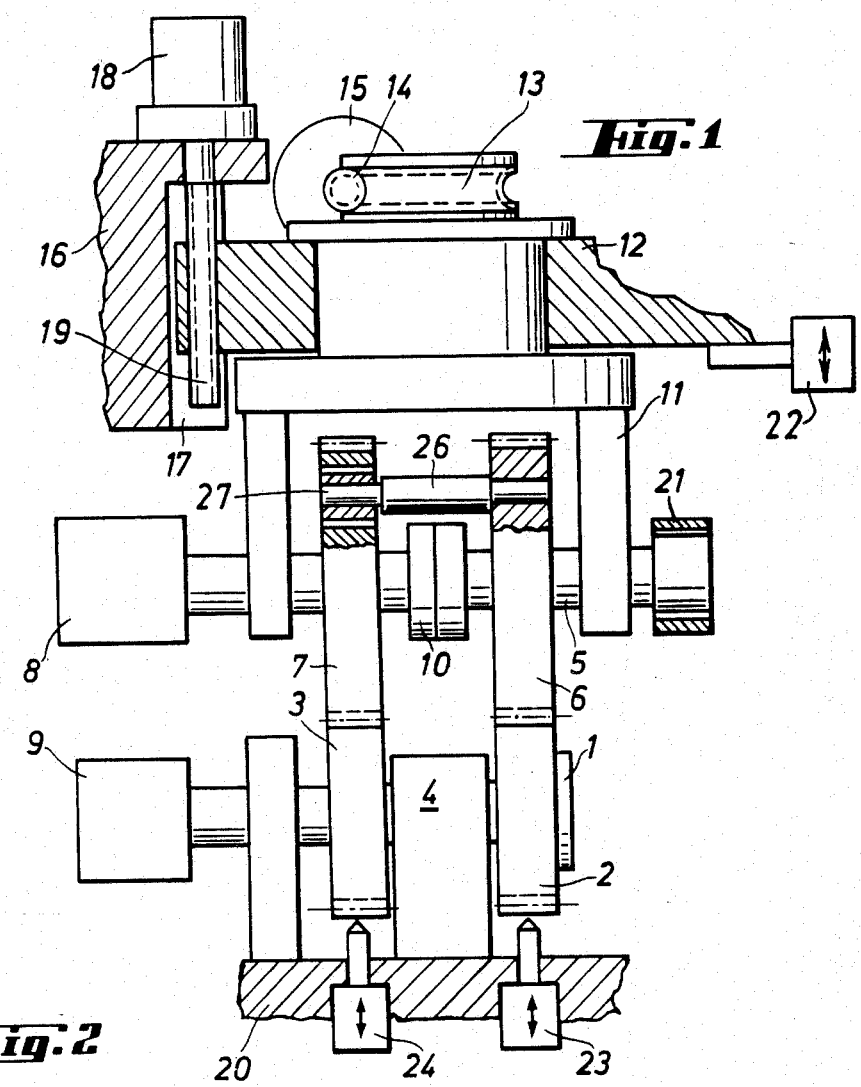
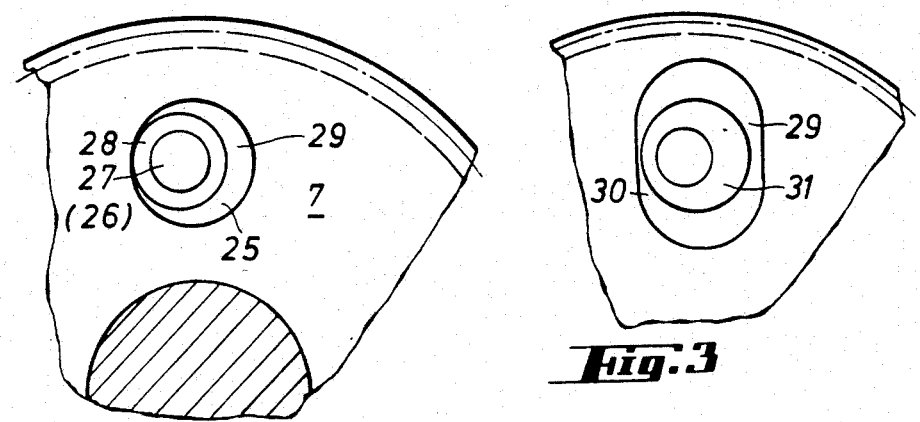

APPARATUS FOR THE MANUFACTURE OR MACHINING OF GEARS BY ROLLING ON A TOOL HAVING ABRASIVE WORKING SURFACES

CROSS REFERENCE TO RELATED APPLICATIONS

This application is related to the following copending applications:

Ser. No. 816 946, filed Jan. 6, 1986, which is a continuation of Ser. No. 576 672, filed Feb. 3, 1984, now abandoned.

FIELD OF THE INVENTION

The invention relates to an apparatus for the manufacture or machining of straight or helically toothed gears by at least one tool having abrasive working surfaces.

BACKGROUND OF THE INVENTION

The considerations which led to the development of the invention started out from a toothed tool for the precision working of gears, the working surfaces of which consist of a mineral material. During a rolling of such a tool on the teeth of the workpiece, due to the different relative sliding relationships over the whole tooth height, different material amounts are removed, so that tooth form or profile errors cannot, in every case, be corrected (German OS No. 23 06 780).

The apparatus of the invention avoids this deficiency by providing a guide-gear pair, which supports the tool or the workpiece. It is true that a guide-gear pair is already known for supporting of the tool during gear shaving, however, same serves an entirely different purpose. That is, gear shaving is done backlash-free. By changing the tooth flanks which are in engagement, a different number of tooth flanks always participate in the shaving operation, which causes different tooth-system errors than the above-described ones. This deficiency was overcome by the said guide-gear pair, which also runs backlash-free. This try was not successful. (German Pat. No. 1 161 465).

The apparatus according to the invention avoids both errors, by the workpiece and tool rolling on one another with backlash; however, the apparatus is designed such that the degree of chip removal started out from a premachined or preworked workpiece. Thus, the tooth thickness of the finished gear could depend from the tooth thickness of the premachined workpiece.

The basic purpose of the invention is to make different chip feeds on the premachined workpiece nondamaging, that is to always achieve the same final size or finished dimension in spite of different chip feeds. This is by all means not an obvious thing to accomplish, because the two tooth sides of the workpiece are machined one after the other (not simultaneously like in the case of the backlash-free machining).

The basic purpose of the invention is attained by providing an apparatus capable of changing or adjusting the relative positions between the workpiece/tool pair and the guide-gear pair. This thought is not only valid for externally toothed workpieces but also for internal gears. The difference with respect to the older suggestion is that in the older suggestion, the depth of the chip removal on the two workpiece tooth flanks started out from the premachined flanks whereas the invention starts out from the just machined flank or one tooth side. The machining of the other tooth side is referenced thereto. Thus the starting dimension for the second flank is the machined first flank.

The invention can also be applied to apparatus in which more than one tool engages the workpiece.

It is particularly important for the machining task according to the invention, that the tooth flank of the workpiece, which is just being machined, is supported by the mating flank on the guide-gear pair.

Also advantageous for the invention is the adjustment of the chip feed, because same is carried out by means of a radial adjustment. The adjustability in peripheral direction is alone reserved for the precision adjustment according to the invention. Of course, this is valid only for the adjustabilities which are started from outside. The actual chip removal occurs in reality in two coordinates, namely, radially through the chip feed by a carriage or the like and in the peripheral direction through the tooth flanks of the guide-gear pair due to the pressure angle at the pitch point.

Further characteristics and advantages of the invention can be taken from the following description.

BRIEF DESCRIPTION OF THE DRAWINGS

The invention is discussed in further detail with reference to FIGS. 1 to 16, in which:

FIG. 1 schematically illustrates as an exemplary embodiment an apparatus according to the invention;

FIG. 2 schematically illustrates as a detail a stop mechanism for the apparatus according to FIG. 1;

FIG. 3 illustrates a layout of a different stop mechanism;

DETAILED DESCRIPTION

Figure 4:
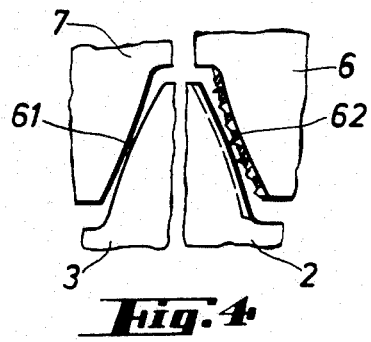
FIG. 4 schematically illustrates the contacting tooth flanks of the guide-gear pair according to the invention and the corresponding mating flanks of a workpiece-tool pair prior to the start of the first chip removal.
Figure 5:
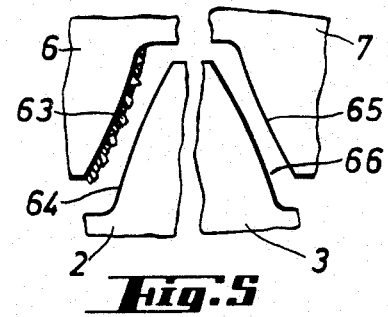
FIG. 5 illustrates the flanks which belong with FIG. 4 and which do not contact each other.

A workpiece 2, a straight or helically toothed gear and next to it a first guide-gear 3 are exchangeably mounted on a work spindle 1. A tool 6 and next to it a second guide-gear 7 are exchangeably mounted on a tool spindle 5. The workpiece mates with the tool and the first guide-gear mates with the second guide-gear during the machining operation. The guide-gear pair 3, 7 has the same speed ratio as the workpiece-tool pair 2, 6. The entire gearing 2, 3, 6, 7 can run with spaced parallel axes or with spaced axes which are crossed. If machining is done with crossed axes and in the socalled plunge method, thus exclusively with down-feed, the tool and/or the guide-gears must be designed depending on the position of the crossed-axes point (common normal): the tool must, gripping around the workpiece, be formed hyperboloidally or globoidally or similarly. One of the guide gears must also be designed accordingly, namely, depending on the position of the crossed-axes point, symmetrically or asymmetrically to the tool. One of the two spindles, for example the tool spindle 5, is coupled to a motor 8, while the other spindle, for example the workpiece spindle 1, is provided with a brake 9. A clutch 10 is furthermore provided on the tool spindle 5, with which clutch the tool spindle can be uncoupled. The spindle 5 can also be designed continuous, then the clutch is arranged between the spindle and the tool; so it is possible to disconnect the tool from the spindle with the clutch. A blocking brake 21 is in addition provided on the part of the tool spindle which is separable from the drive, which blocking brake can be operated mechanically, hydraulically or electrically, for example by an electromagnet.

The tool spindle 5 is supported on a tool head 11 rotatably supported however, not longitudinally movably in a tool carriage 12. A worm gear 13 and a worm 14 are provided for drivingly rotating the tool head. The worm 14 can be driven by a crank or a motor 15. With this a crossed-axes angle can be adjusted. In addition, means for clamping or locking of the tool head are advantageously provided, which means—since known—are not illustrated. The tool carriage 12 is vertically movably supported in a guide 17 on a machine frame 16. A feed spindle 19 threadably coupled to the tool carriage 12, is driven by a motor 18. The guide 17, and, in addition, a second one which is not illustrated, is adjusted or set such that the center distance of the spindles 1, 5 can be changed by moving the tool carriage. This structure facilitates, among others, the carrying out of a chip feed. Clamping or locking means for the tool carriage 12 are, since known, not illustrated. The motors 15, 18 for the tool head and the tool carriage, respectively, can be switched with one another so that with a changing of the center distance between the spindles, the tool head 11 swings if necessary so that the crossed-axes angle (if existing) adjusts to the respective center distance, corresponding with the pitch angle in the pitch circle of the tooth systems.

If the apparatus is not used for a plunge method but also for machining with a longitudinal feed, then the bearing block 4 is to be arranged on a drivable carriage 20. To limit the down-feed travel of the carriage 12, an adjustable stop 22 is provided. In order that the workpiece 2 can be fed during loading aligned to the remaining gearing, drivable indexing devices 23, 24 are arranged such that they can engage the tooth systems of the workpiece and of the first guide-gear.

A bore 25 is provided in the body of the second guide gear 7 at a distance from the tool spindle 5. An axially extending bolt 26 is secured to the body of the tool 6 and projects into the mentioned bore. The bolt 26 is preferably reduced in diameter to a pin 27 in the region of the bore. An elongated sleeve 28 encircles the pin and can be secured thereon. If the sleeve 28 rests against one side of the bore, then a spacing 29 results on the other side between the sleeve 28 and the wall of the bore 25, which spacing, and with a suitable dimensioning of the sleeve corresponds with an amount of $\alpha+\beta$ described in further detail below and with reference to FIGS. 4 to 9. The bore 25 can be replaced with a slotted hole 30 and the sleeve 28 can be replaced with an eccentric sleeve 31 as shown in FIG. 3. The spacing 29 can be changed to the desired value not by exchanging the sleeve but by rotating the eccentric.

FIG. 1 is only a schematic illustration. The two gear pairs are preferably arranged closer to one another on the two spindles. The shifting part of the clutch can then be arranged outside of the two gear pairs.

FIGS. 4 to 9 schematically illustrate, so to speak, a view axially through the tooth systems, namely, in each case always the associated tooth sides of the guide-gears and of the workpiece-tool pair which are in engagement. Thus, in FIG. 4, the left flanks 61 of the guide gears 3, 7 contact one another while, at the same time, the mating flanks 62, thus the right flanks, of the workpiece-tool pair 2, 6 contact one another. The tooth flanks are illustrated in the same schematic manner in FIG. 5. The gears each have backlash on the trailing side 63 to 66 of the teeth. It is clear that each of the gears thus runs with backlash, however, the entire gearing arrangement operates backlash-free or without backlash.

Figure 6:
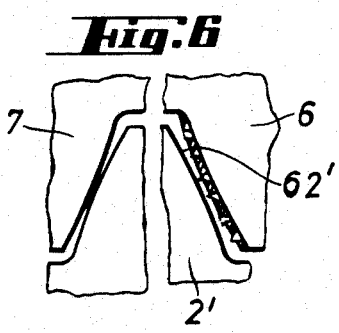
FIGS. 6 and 7 illustrate the tooth flanks after the first chip removal.
Figure 7:
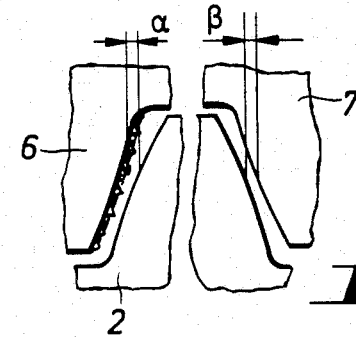
Figure 8:
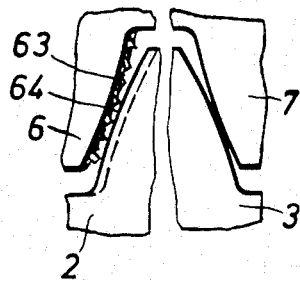
FIGS. 8 and 9 illustrate the tooth flanks prior to the chip removal on the second flank.
Figure 9:
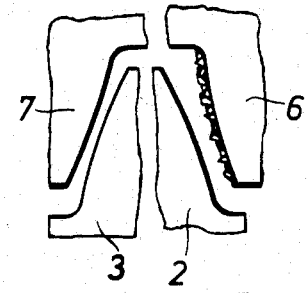

After rotation in one direction, for example, the right flank 62 of the workpiece has been machined (FIG. 6), and there exists on each of the corresponding trailing flanks a backlash $\alpha$ or $\beta$ (FIG. 7). The stop mechanism shown in FIG. 2 has in this condition the illustrated position, namely, the sleeve 28 rests against one side of the bore 25 and on the other side there exists a spacing 29 which has a dimension equal to $\alpha+\beta$. After the spindles have again been moved away from one another, the motor 8 is driven at a creep feed rate in the opposite direction of rotation, and a condition occurs, as it is illustrated in FIGS. 8 and 9. The left flank of the workpiece 64 is now to be machined from this position. The spacing 29 equaling $\alpha+\beta$ determines the tooth thickness of the workpiece. The reference surface for the left flank (FIG. 8) is, in the example, the previously machined right flank 62' (FIG. 6). The spacing 29 which determines the tooth thickness is adjusted one time at the start of the machining series and needs only to be readjusted when the tool changes for any reason. The importance of the invention is that in machining the second side of the workpiece teeth (FIG. 8), one does not start out aligning the tool teeth from the nonmachined flank of the second workpiece tooth flank but from the first previously machined workpiece tooth flank (FIG. 6). From this results a finish tooth thickness which is measured from the first workpiece tooth flank, even though both tooth sides are machined successively.

To adjust the spacing 29, the clutch 10 is opened and the blocking brake 21 is put on. During the actual machining operation, the blocking brake is released and the clutch is closed. With the clutch closed the relative position of the gears 2, 6, 3, 7 is fixed. To effect a secure flank contact between the guide gears during the machining operation the brake 9 is utilized. The chip feed occurs with the tool carriage 12. The adjustable stop 22 limits the down-feed movement. If the guide-gear pair 3, 7 runs without backlash, then the amount $\beta$ in FIG. 7 no longer exists. The spacing 29 is then only measured according to the value $\alpha$.

Figure 10:
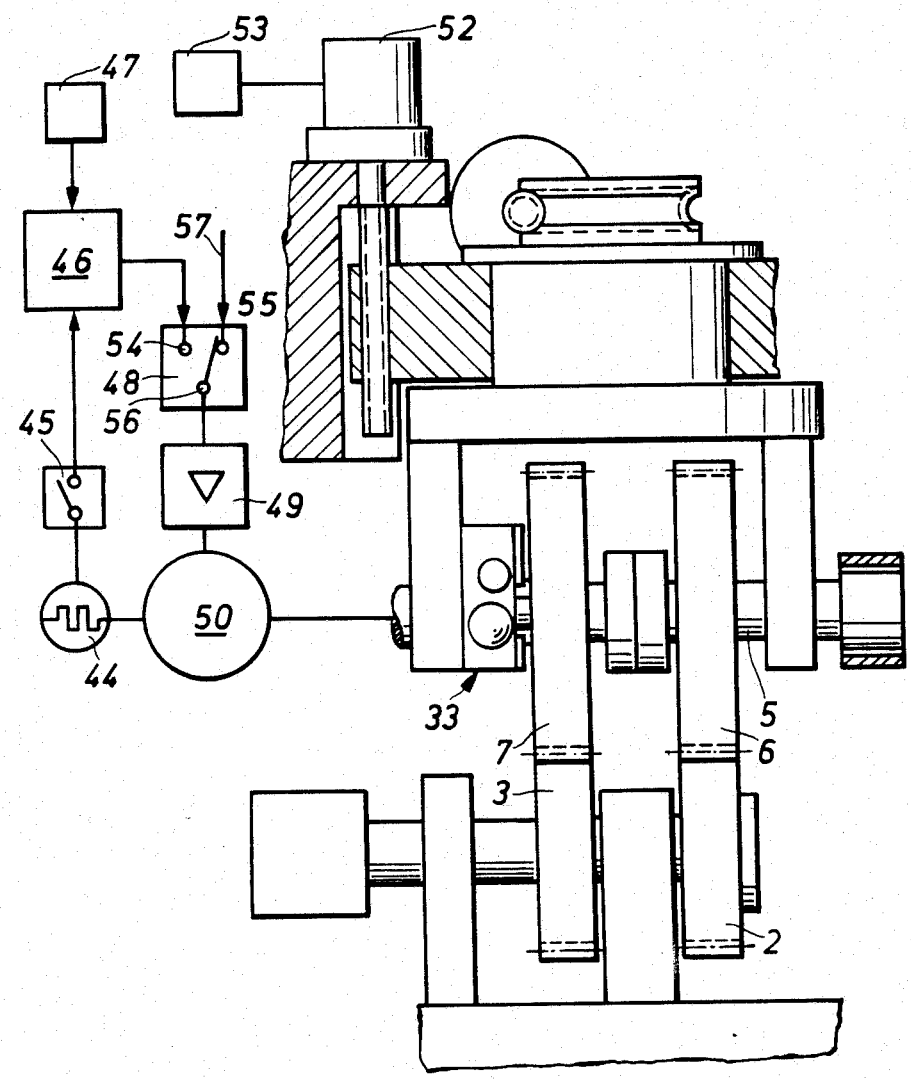
FIG. 10 schematically illustrates another exemplary embodiment of the invention.

FIG. 10 illustrates another embodiment of an apparatus according to the invention. The structural parts are substantially the same as in FIG. 1. However, two different devices are illustrated for considering the dimensions and (FIG. 7). One of these devices is the stop mechanism 33, as it is schematically illustrated in an enlarged scale in FIG. 11. A bolt 34 which extends parallel with respect to the axis of rotation is secured to the hub of one of the guide-gears, for example the gear 7. A housing 35 is secured to a support for the corresponding spindle, in this case the spindle 5, or a part which is connected thereto. A slide member 36 is movably supported in the housing 35 and is movable perpendicularly with respect to the spindle axis. At the end adjacent the spindle, the slide member 36 is provided with a stop 37, at the other end with a handle 38 or the like. If the slide member 36 is moved into an active position (illustrated), then the stop surface 39 of the stop 37 is in the circular path of rotation of the bolt 34. In the pulled-back condition of the slide member 36, the guide-gear 7 can rotate freely. The slide member 36 can be locked in the pulled-back position by a screw 40 or the like. A stop slide member 41 is movably supported on the slide member 36, the active surface 42 of which stop slide member lies opposite and opposes the stop surface 39. The position of the stop slide member can be adjusted by a micrometer screw 43 or the like. The active surface 42 is sloped or inclined to the horizontal so that the distance between it and the bolt 34 changes depending on the position of the stop slide member relative to the axis of rotation of the guide-gear. The operation is principally the same as in the apparatus according to FIG. 2. The handling, however, is simpler because the distance 29 can be easily adjusted. The apparatus can be further developed by also sloping or inclining the stop surface 39; with this the alignment according to FIGS. 6, 7 could be made easier.

FIG. 10 contains also an electric apparatus for controlling the change of the flank contacts, as they are described for example with reference to FIGS. 4 to 9. The stop apparatus 33 is thereby not needed. One of the spindles, for example the tool spindle 5 is coupled to a servomotor 50. It drives the apparatus on the one hand for an actual machining operation, on the other hand for a creep feed and finally, controlled by the positioning control described below, for positioning. A measured-value receiving means 44 is driven by the servomotor 50 for the purpose of positioning, which measured-value receiving means breaks down the motor rotation into increments. Such an apparatus is commercially available (for example from the firm Heidenhain Traunreuth, West Germany). It is also possible to use a socalled absolute regulator, which is also commercially available (for example from the firm Stegmann, Donaueschingen, West Germany). The impulses are passed on through a switch 45, which during the actual machining operation and during the creep feed is open, to a positioning control device 46. The control device 46 counts and stores the received impulses. Correcting values, which for example consider a form change due to the dressing of the tool, can be added from a correcting input 47 and can be mathematically correlated in the positioning control 46. The values are outputed as analogue signals for the drive (servomotor 50) at specified intervals of time. The positioning control device contains both a speed control system and also a socalled local control system. This means for the latter, that the path increments (distances moved) which occur during positioning are compared and are processed as stored information. The positioning control device is connected by not illustrated lines to the electric circuit. The positioning control device is actually known and commercially available (for example from the firm Siemens, Muenchen, West Germany).

The impulses of the positioning control device 46 are outputed through a switch 48 and an amplifier 49 for the purpose of positioning of the tooth flanks by the servomotor 50. For this a connection through the contacts 54, 56 (the switch lies to the left) is created, that is when the local control system operates, in order to move to a specific position.

The servomotor is energized through a line 57 and the contacts 55, 56 (switch lies to the right) for the actual machining operation and for the creep feed, in order to control the contact against the tooth flanks.

The motor 52 for effecting the down-feed is controlled by a transmitter 53, which limits the amount of the down-feed movement (number of rotations of the feed spindle). The apparatus according to FIG. 10 can be supplemented by an indexing device which is not illustrated in this drawing, but it is illustrated in FIG. 1. It serves here too as an indexed chucking of the workpiece.

Figure 11:
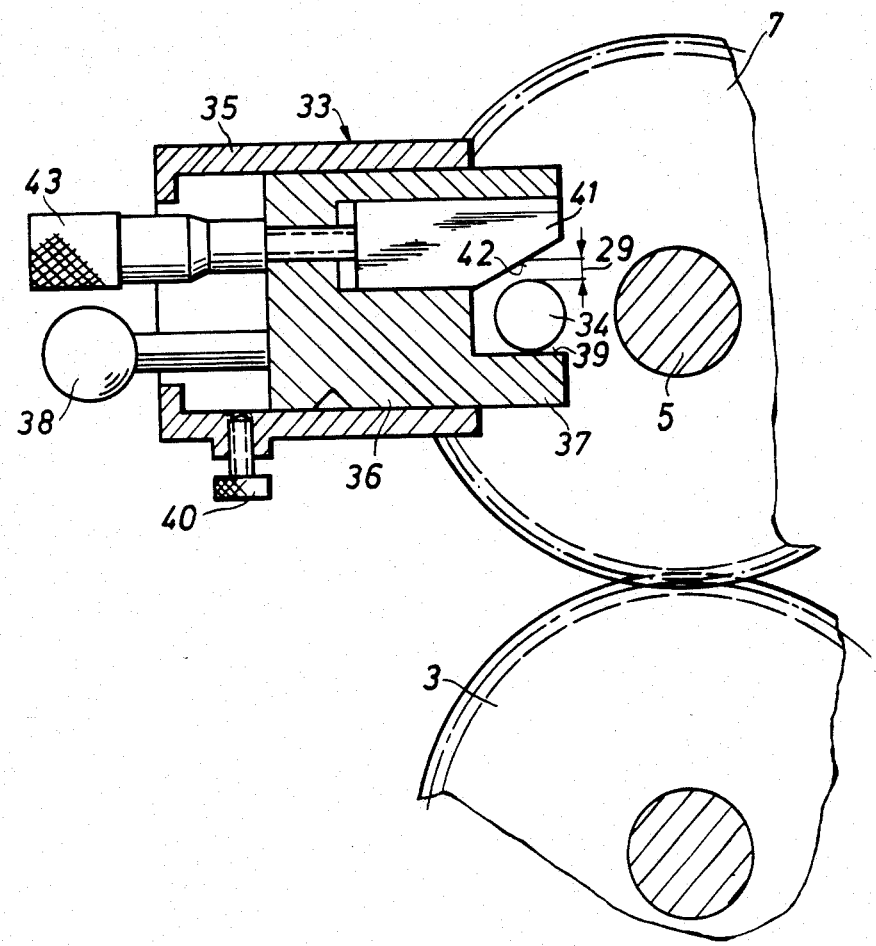
FIG. 11 illustrates as a detail a stop mechanism for the apparatus according to FIG. 10.
Figure 12:
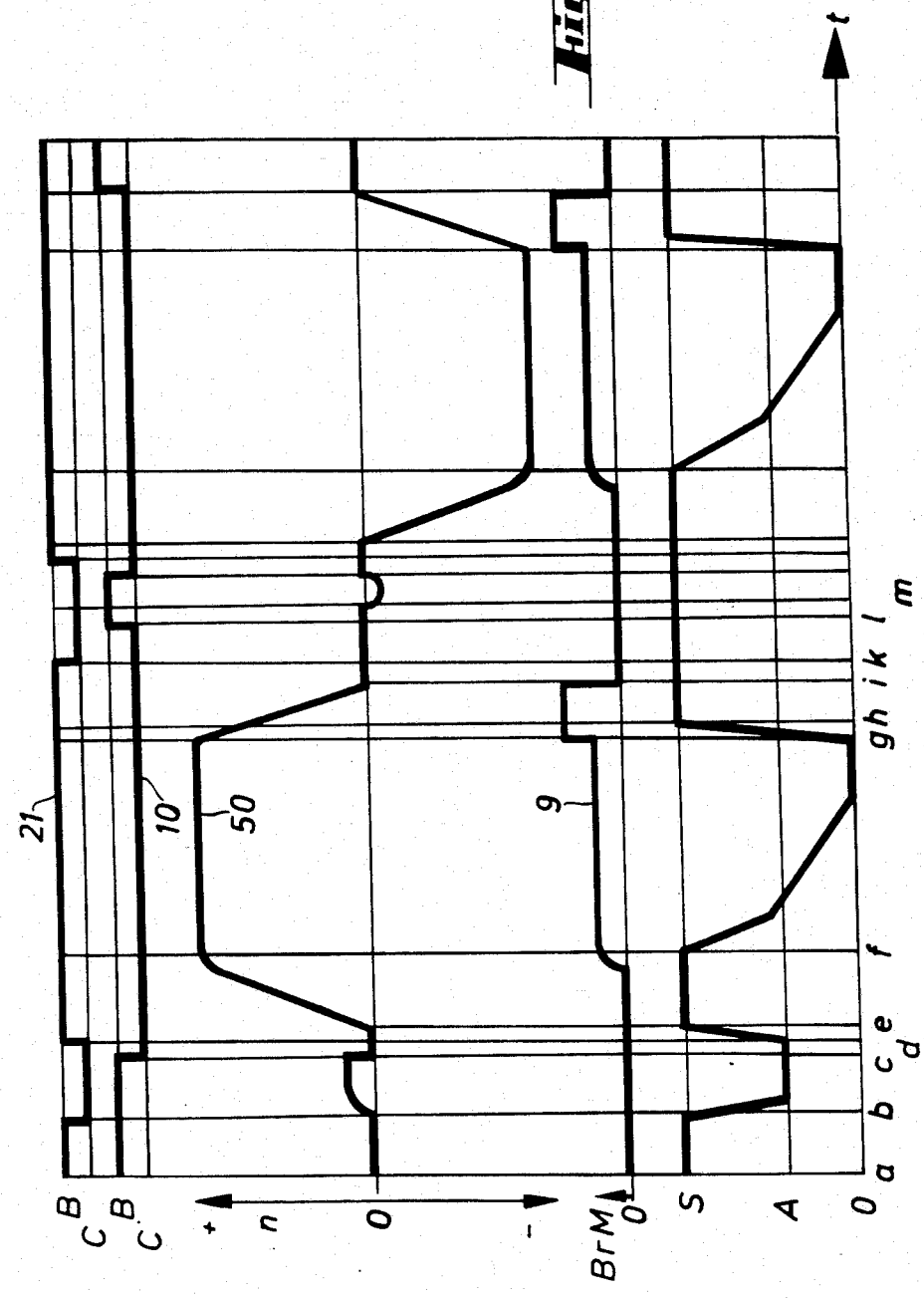
FIG. 12 illustrates a diagram for the sequence of operation of an apparatus according to the invention.

FIG. 12 illustrates a diagram of the sequence of operation of an apparatus according to FIG. 11. The individual indexing steps are plotted over the time t, and the lengths of the abscissa have no assigned value.

The uppermost line describes the conditions of the blocking brake 21. The conditions of the clutch 10 extend therebelow. The speed of the servomotor 50 follows therebelow, the small elevation is the creep feed, the large elevation the working speed. The course of the braking moment BrM. of the brake 9 lies therebelow. The three important center spacings S, A and 0 of the two spindles are plotted at the very bottom. The individual steps are identified by the letters a to k along the abscissa. It is assumed that the apparatus has already been set up.

a. The workpiece is chucked, the blocking brake 21 is open (letter B), the clutch 10 is open (letter B). The servomotor 50 is stopped. The braking moment of the brake 9 equals zero. The spindles are at their greatest center spacing S.

b. The blocking brake 21 is activated (letter C). Motor 50 starts to creep feed speed. The axes of the spindles approach the starting position A for the machining operation.

c. The flanks of workpiece and tool contact one another. The clutch 10 is closed (letter C). The creep feed speed is discontinued.

d. The blocking brake is opened. The spindles are moved back into the initial position (safety spacing S).

e. When the safety spacing S is reached, the servomotor 50 begins increasing toward the working speed.

f. Prior to reaching a maximum speed, the brake 9 builds up a countermoment, with which a secure flank contact is assured. The spindle feed is activated. It first runs at a rapid traverse. Prior to reaching the center spacing A for effecting the start of the chip removal process, a switch to machining feed speed takes place.

g. Chip removal terminates at the end center spacing O. The motor is turned off, it coasts to a stop. The brake is turned on to a full braking moment.

h. Safety spacing S is again reached.

i. Motor stops, and the brake 9 is deactivated.

j. The blocking brake is activated, set position at counter 47 either to zero or fix numerical value of the position.

k. Open clutch.

1. Turn on motor for creep feed speed with opposite direction of rotation. The gears rotate from one position (FIGS. 6, 7) into the opposite position (FIGS. 8, 9) through an amount $\alpha+\beta$. This amount is stored in the counter and is either counted from zero or is added to the fixed numerical value.

The further sequence of operation corresponds to the letters c to k.

Figure 13:
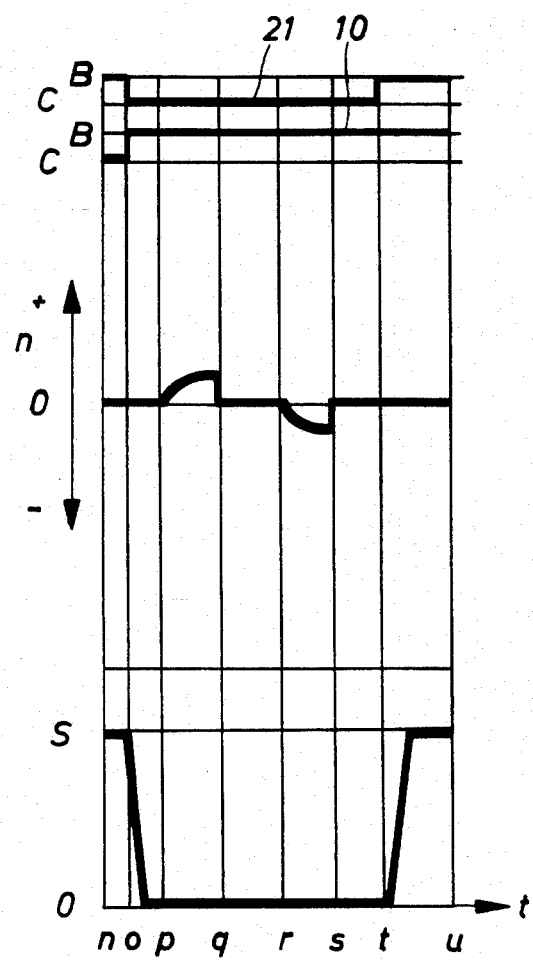
FIG. 13 illustrates a diagram for the sequence of operation during a setting up of the guide-gear pair and of the workpiece tool pair.

FIG. 13 illustrates in the form of a diagram the sequence of operation for the dimensioning and storing of the amount $\alpha+\beta$ (FIG. 7). The symbols are the same as in FIG. 12. The working steps are identified by the letters m to t.

m. Chucking of a sample of the finished workpiece.

n. Blocking brake 21 closed, clutch 10 opened. Approaching of the work spindles to the end-center spacing O.

o. Turning on of the motor 50 to creep feed speed until p. a tool flank contacts the sample flank (corresponds with FIG. 6). Set numerical value of the counter 47 to zero or fix numerical value.

q. Turn on creep feed speed of the motor in opposite direction of rotation until r. the other tool flank contacts the sample flank. Determine numerical value. Form and store difference value to the numerical value to p.

s. Open blocking brake 21, move spindles apart to the safety spacing S.

t. Exchange sample with unmachined workpiece.

Figure 14:
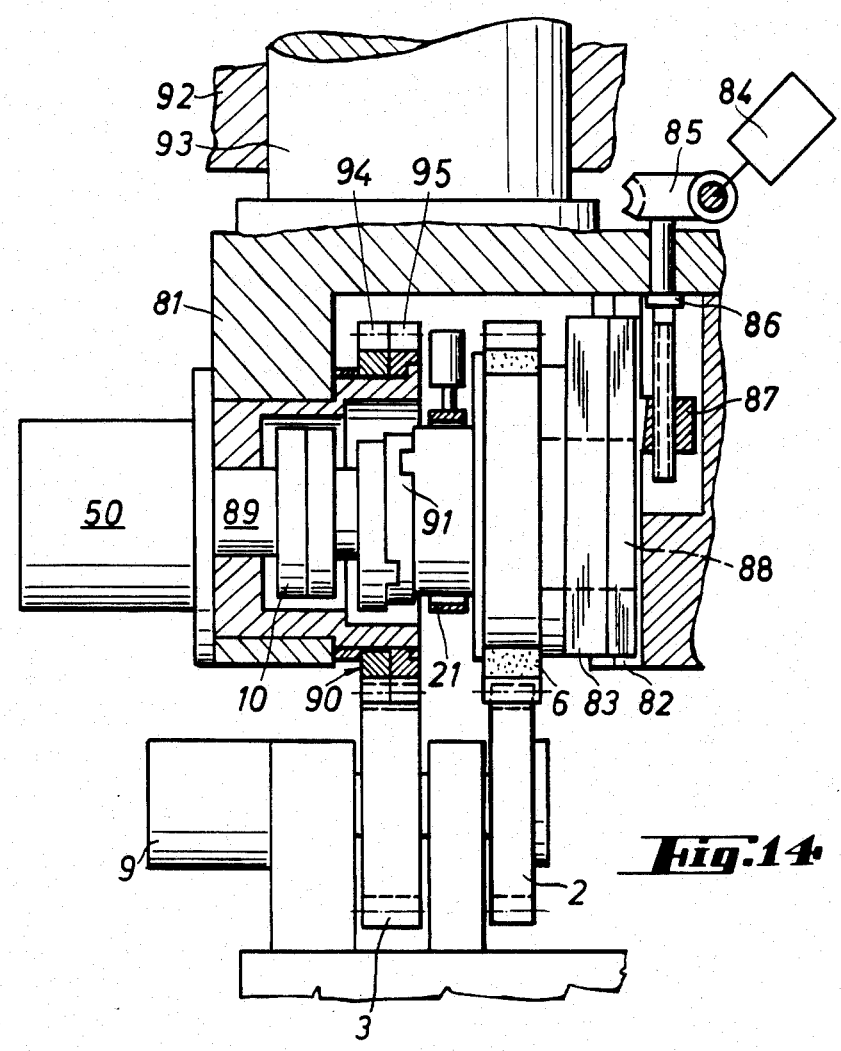
FIG. 14 schematically illustrates a further exemplary embodiment according to the invention.

FIG. 14 illustrates an apparatus in which the guide-gears run backlash-free, the workpiece-tool pair, however, is illustrated inventively with backlash as in FIGS. 4, 6, 8.

A known carriage guide (dovetail guide or prism guide) 82 is provided in a tool carriage 81 which can be fed radially to the workpiece 2, in which guide an additional carriage 83 is guided also radially to the workpiece 2. The additional carriage can be driven by an electric motor 84 through a worm gearing 85, a feed spindle 86 and a feed nut 87 secured to the additional carriage. A tool spindle 88 is rotatably supported, however, not longitudinally movably supported on the additional carriage. The tool spindle 88 has the tool 6 mounted thereon in a conventional manner. Approximately coaxially or axially parallel to the tool spindle 88 there is rotatably supported a guide-gear spindle 89 on the tool carriage 81. One of the guide-gears 90 is rotatably supported on the guide spindle. The outer end of the guide-gear shaft is coupled to the motor 50. The tool carriage 81 is supported in the machine frame or a part 92 having a circular guide 93 connected thereto, so that with this a crossed-axes angle between the workpiece and the tool can be adjusted. A not illustrated clamping device for fixing the angle is provided. One of the guide-gears, for example the gear 90 which mates with the gear 3, is divided in a rotational plane, so that two gear halves 94, 95 are formed, which in a conventional manner are coupled counter rotatingly with one another by resilient means, for example rubber sleeves or the like, not shown. The teeth of these two gear halves engage counter rotatingly the guide-gear 3, which cause the backlash to be determined. The clutch 10 is arranged on the guide-gear spindle 89, so that the spindle can be severed or uncoupled from the tool spindle 88. The support of one half of the guide-gear spindle 89 is not illustrated for clarity purposes. The blocking brake 21 is arranged on the tool spindle 88. Between the tool spindle 88 and the guide-gear spindle 89 there is provided a cross-keyed coupling 91 to accommodate an axial misalignment of the two mentioned shafts.

Figure 15:
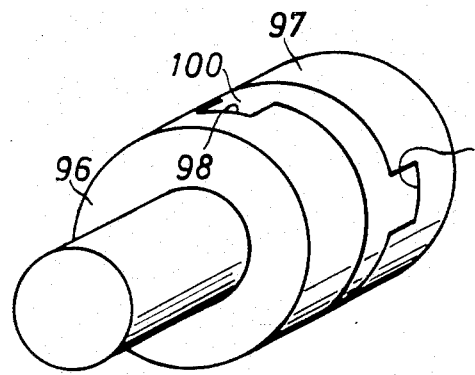
FIGS. 15 and 16 schematically illustrate a cross-keyed coupling.
Figure 16:
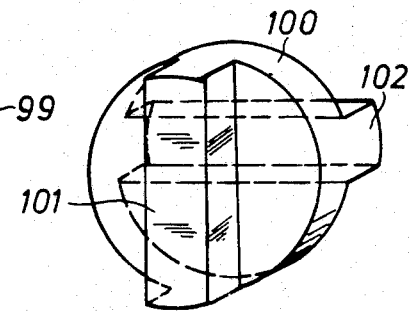

The cross-keyed coupling 91 is schematically illustrated in FIGS. 15 and 16. The coupling consists substantially of two coupling halves 96 and 97, which are each provided with a groove 98, 99 on an axially facing side, which groove extends through the center line or axis of rotation. The grooves 98, 99 are also perpendicularly oriented. A cross-keyed plate 100 is inserted between the coupling halves, which cross-keyed plate has a tongue 101, 102 on each of its axially facing sides. The tongues 101, 102 are oriented perpendicularly to one another and fit into the grooves 98, 99, respectively. Balls or rollers, preferably with interference, can be inserted between the sliding surfaces (not illustrated). The operation of the apparatus according to FIG. 14 is in principle the same as the one described above with the single important difference, namely, that the guide-gears 3, 90 run backlash-free, so that during side adjustment, that is, changing the side on which the tooth of a workpiece is worked, the amount 8 does not exist.

The invention is not to be limited to the described embodiments. Same can rather be modified in many ways. Thus, it is possible in the apparatus of FIG. 10 to provide in place of the servomotor 50 a separate drive for each movement.

The embodiments of the invention in which an exclusive property or privilege is claimed are defined as follows:

1. In an apparatus for the manufacture of straight or helically toothed workpieces using at least one toothed tool having abrasive working surfaces and which roll alternately with single-flank contact on a workpiece, the relative position between said workpiece and tool, during this rolling movement, being controlled by a tooth system of a guide gear means which also rolls with a single-flank contact, the contacting tooth flanks of said guide gear means being the counter-flanks of a workpiece-tool pair, said apparatus including first adjusting means for changing the contacting tooth flanks by rotation of a member of said workpiece-tool pair relative to at least one member of said guide gear means, and a pair of stops for limiting the amount of relative rotation between said workpiece-tool pair and said guide gear means, the improvement comprising wherein a first of said pair of stops limits the extent to which contact of finish worked tooth flanks on said workpiece occurs on the corresponding tooth flanks of said tool and said counter-flanks of said guide gear means, and a second of said pair of stops limits the extent to which relative rotation occurs between said workpiece-tool pair and said guide gear means to control finish working of the counter-flanks of said workpiece and the contact of the flanks of said guide gear means, and second adjusting means for selectively adjusting the magnitude of and the relative position between said relatively rotatable workpiece-tool pair and said guide gear means.

2. The apparatus according to claim 1, including a controllable servomotor for at least one of said tool and said workpiece spindle, an electrical control means with a positioning control device for transmitting to said servomotor signals for effecting an additional rotary movement corresponding with a selectively adjustable position between said relatively rotatable workpiece-tool pair and said guide gearing to change the contacting tooth flanks, and a correcting input means connected to said positioning control device for facilitating a correlation of said selectively adjustable position to form change caused by a dressing of said tool.

3. The apparatus according to claim 1, wherein said apparatus includes a feed means for effecting a chip removal by changing the center distance between said workpiece and said tool.

* * * * *